United States Patent [19]

Kobayashi et al.

[11] Patent Number: 4,898,144
[45] Date of Patent: Feb. 6, 1990

[54] INTAKE SYSTEM FOR INTERNAL COMBUSTION ENGINE

[75] Inventors: Manabu Kobayashi, Iwata; Kazutoshi Suzuki, Fukuroi; Takeo Kondo, Iwata, all of Japan

[73] Assignee: Yamaha Hatsudoki Kabushiki Kaisha, Iwata, Japan

[21] Appl. No.: 333,717

[22] Filed: Apr. 3, 1989

Related U.S. Application Data

[63] Continuation of Ser. No. 845,576, Mar. 28, 1986, abandoned.

[30] Foreign Application Priority Data

Mar. 30, 1985 [JP] Japan .................................. 60-67164

[51] Int. Cl.$^4$ ........................................... F02M 35/10
[52] U.S. Cl. ................................... 123/52 M; 123/432
[58] Field of Search ............... 123/52 M, 52 MB, 380, 123/432, 188 M

[56] References Cited

U.S. PATENT DOCUMENTS

| | | |
|---|---|---|
| 2,862,490 | 12/1958 | Trisler . |
| 2,916,027 | 12/1959 | Chayne et al. . |
| 3,230,944 | 1/1966 | Kiekhaeffer ..................... 123/52 MB |
| 3,441,008 | 4/1969 | Nelson ............................ 123/52 MB |
| 3,814,069 | 6/1974 | Croft et al. ....................... 123/52 M |
| 3,943,906 | 3/1976 | Hirose et al. .................... 123/179 G |
| 4,030,459 | 6/1977 | Hori et al. ........................ 123/52 M |
| 4,353,211 | 10/1982 | Cser et al. .............................. 60/605 |
| 4,441,464 | 4/1984 | Toyoda et al. ................... 123/52 MB |
| 4,510,896 | 4/1985 | Rutschmann .................. 123/52 MB |
| 4,538,556 | 9/1985 | Takeda ............................ 123/52 MB |
| 4,565,166 | 1/1986 | Takeda ............................ 123/52 MB |
| 4,612,903 | 9/1986 | Urabe et al. ..................... 123/52 M |
| 4,622,926 | 11/1986 | Rutschmann et al. ......... 123/52 MB |
| 4,669,428 | 6/1987 | Ichida et al. ................... 123/52 MB |
| 4,727,829 | 3/1988 | Konda et al. .................. 123/52 MB |

FOREIGN PATENT DOCUMENTS

| | | | |
|---|---|---|---|
| 0647884 | 7/1937 | Fed. Rep. of Germany ... | 123/52 M |
| 1263608 | 5/1961 | France ............................ | 123/52 M |
| 0052522 | 5/1981 | Japan .............................. | 123/52 M |
| 0115818 | 9/1981 | Japan ............................ | 123/52 MB |
| 208121 | 11/1984 | Japan ............................ | 123/52 MB |
| 0498407 | 3/1976 | U.S.S.R. ........................ | 123/52 M |
| 0943416 | 7/1982 | U.S.S.R. ........................ | 123/52 M |
| 0127850 | 1/1919 | United Kingdom .......... | 123/52 MB |

Primary Examiner—Willis R. Wolfe
Attorney, Agent, or Firm—Ernest A. Beutler

[57] ABSTRACT

An induction system for an internal combustion engine wherein each cylinder is served by a pair of intake pasasges having significantly different lengths for tuning them for different engine running requirements. A throttle valve arrangement controls the flow through the intake passages and the selection of the appropriate length for a given running condition.

47 Claims, 4 Drawing Sheets

INTAKE SYSTEM FOR INTERNAL COMBUSTION ENGINE

This is a continuation of U.S. patent application Ser. No. 845,576, filed Mar. 28, 1986, now abandoned.

BACKGROUND OF THE INVENTION

This invention relates to an intake system for internal combustion engines and more particularly to an improved intake system that increases the engine output while at the same time reducing the engine noise.

It is well known that the tuning of the induction system for an engine can be utilized as a way of increasing its power output. The tuning for individual cylinders is done by changing the effective length and cross-sectional areas of the induction passage so as to achieve the best running at the desired running condition. This latter feature is important because any induction system tuning is effective only at a certain engine speed or range of engine speeds. Thus, with conventional induction systems, it has been the practice to tune the induction system for a particularly running condition and select a compromise tuning that will minimize the adverse affect on the engine performance at other ranges. As a result, the maximum efficiency of the engine cannot be enjoyed. In addition, the tuning of the induction system affects the noise generated by the engine and particularly the induction system noise. Thus, the tuning must also be done with the sound characteristics being borne in mind which results in further compromises.

It is, therefore, a principal object of this invention to provide an improved induction system for an internal combustion engine that will increase performance throughout the entire engine speed and load ranges and which will not adversely affect the noise generated by the induction system.

It is a still further object of this invention to provide an induction system for an engine that will produce an improved output and good running at all engine speeds.

SUMMARY OF THE INVENTION

This invention is adapted to be embodied in an intake system for an internal combustion engine having a variable volume chamber, an inlet port that serves the chamber, a first intake passage which serves the intake port, a second intake passage which also serves the intake port and throttle valve means for controlling the flow through the intake passages. The intake passages have substantially different lengths so as to achieve different tuning.

DETAILED DESCRIPTION OF THE PREFERRED EMBODIMENT

Figure 3:
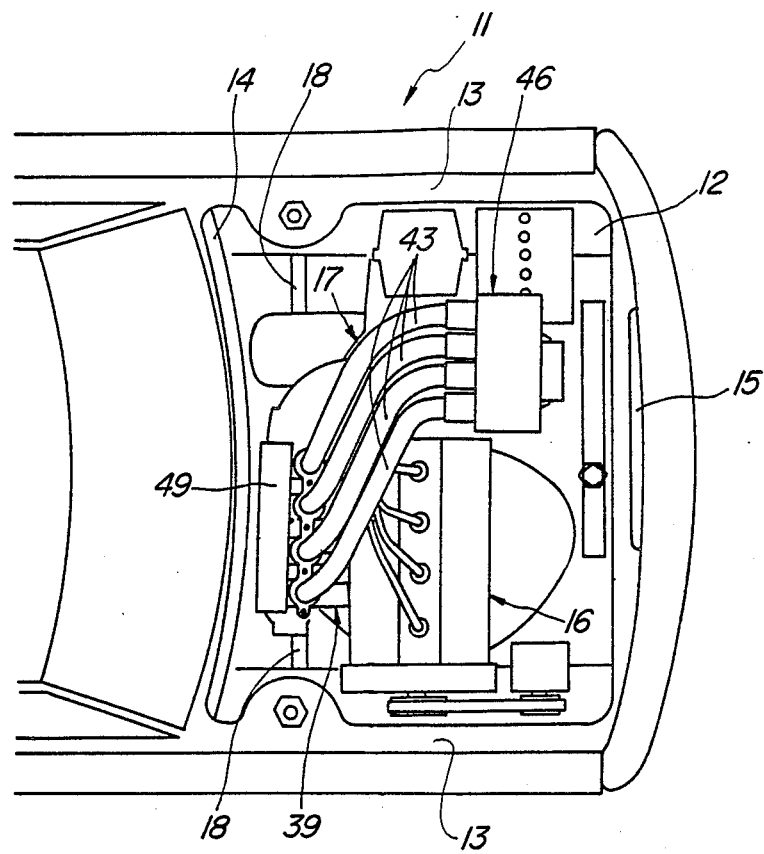
FIG. 3 is a top plan view showing the engine in the engine compartment of the vehicle.

Referring first to FIG. 3, a motor vehicle powered by an internal combustion engine constructed in accordance with an embodiment of the invention is identified generally by the reference numeral 11. The motor vehicle 11 has a body which forms an engine compartment 12 that is defined at least in part by fender aprons 13 and a fire wall 14. An air inlet 15 is provided for admitting air into the engine compartment 12 through a grill opening (not shown). The engine compartment 12 is closed by a hood which has been removed in FIG. 3 to show the construction.

An internal combustion engine constructed in accordance with an embodiment of the invention is identified generally by the reference numeral 16 and is positioned within the engine compartment 12. The engine 16 is, in the illustrated embodiment, of the four cylinder inline type. It is to be understood, however, that the invention may be practiced with engines having other numbers of cylinders and other types of cylinder configurations.

In the illustrated embodiment, the vehicle 11 is of the transverse engine, front wheel drive type and, to that end, the engine 16 is mounted in the engine compartment 12 with its output shaft extending transversely to the longitudinal axis of the vehicle 11. The engine 16 drives a transmission mechanism and transfer drive 17 which, in turn, drives an integral differential for powering a pair of front axle shafts 18 that drive the front wheels in a known manner. The overall configuration of the front wheel drive arrangement is believed to be well known in this art and, for that reason, further discussion of it is believed to be unnecessary.

Figure 1:
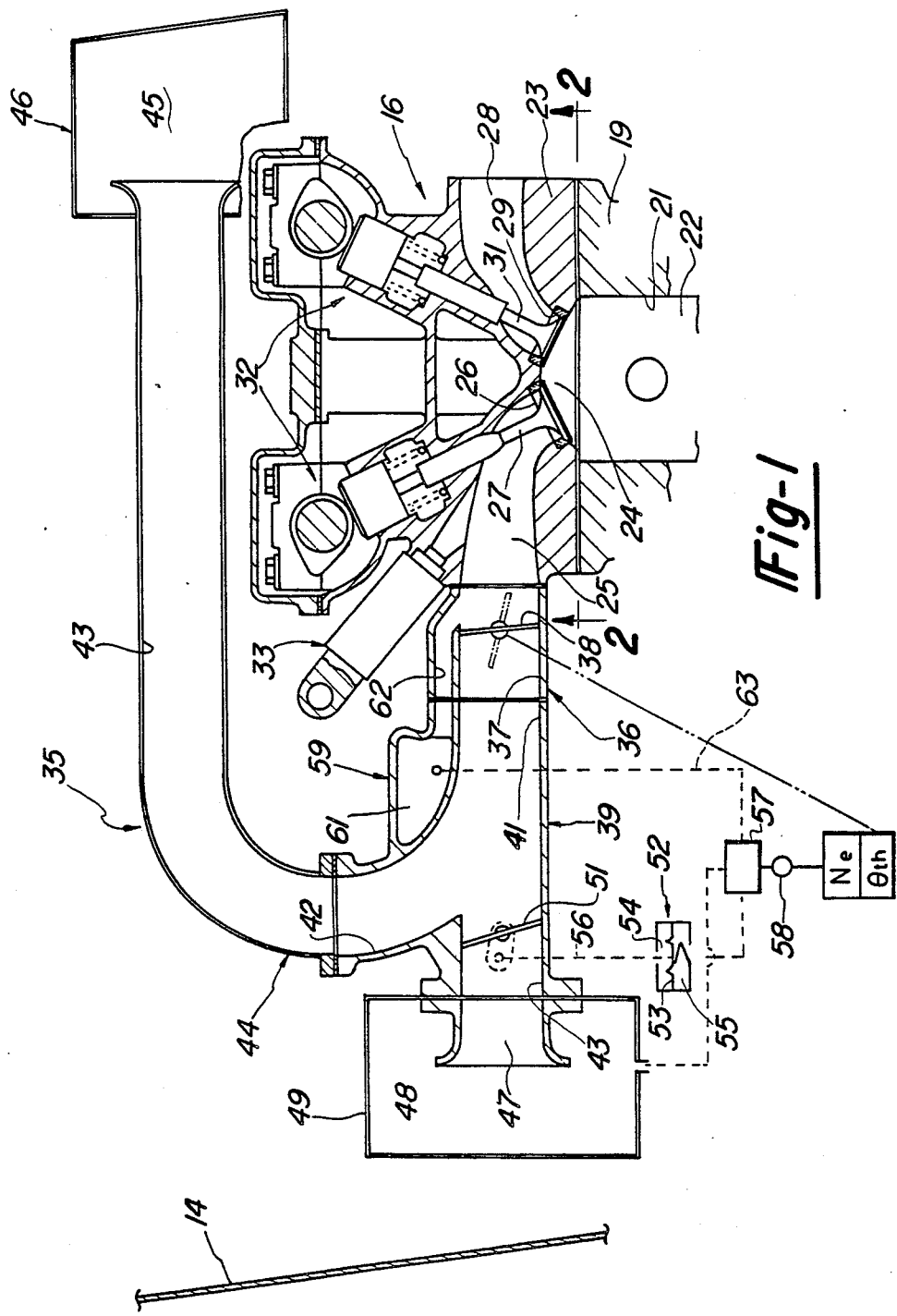
FIG. 1 is a partial cross-sectional view taken through the engine compartment of a motor vehicle showing an internal combustion engine constructed in accordance with an embodiment of the invention.
Figure 2:
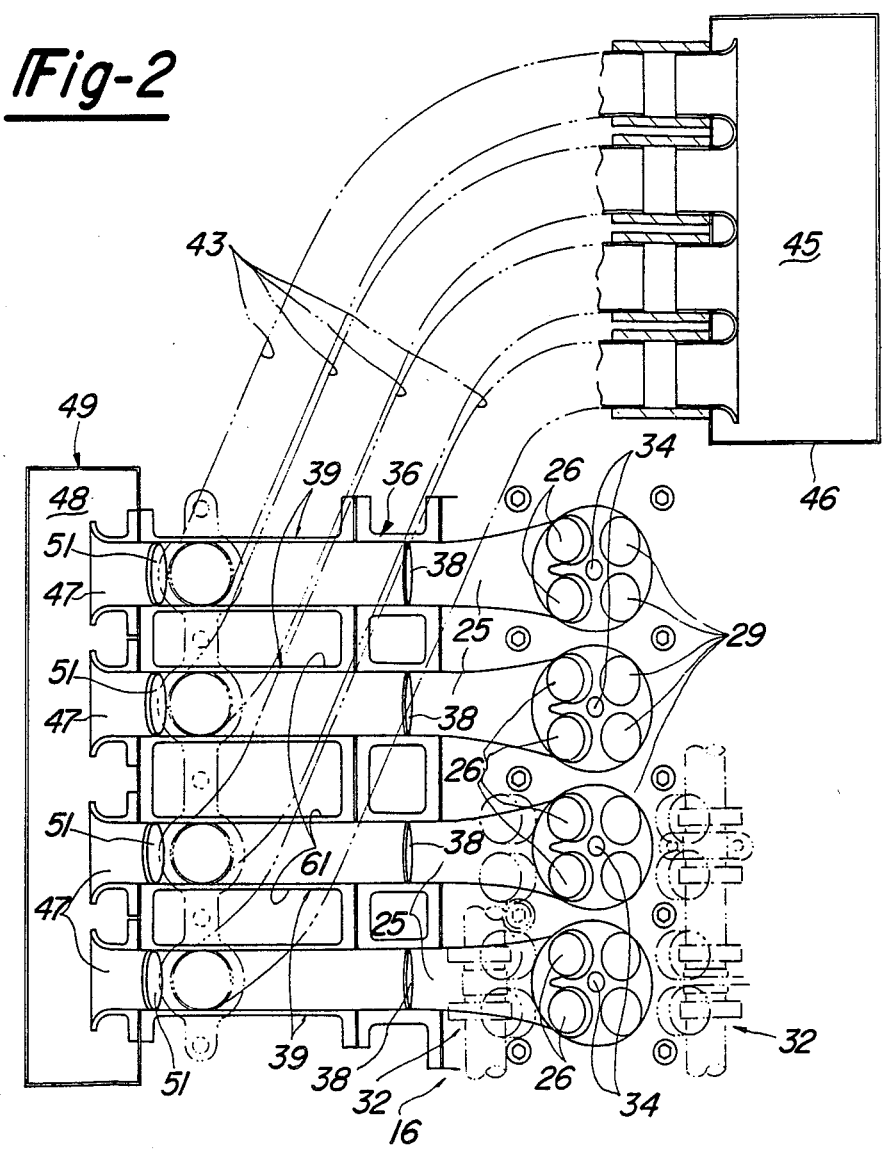
FIG. 2 is a bottom plan view of the engine taken generally along the line 2—2 of FIG. 1.

Referring now additionally to FIGS. 1 and 2 and primarily to these figures, the construction of the engine 16 will be described. The engine 16 includes a cylinder block 19 in which cylinder bores 21 are formed. Pistons 22 are supported for reciprocation within the cylinder bores 21 and drive a crankshaft (not shown) in a known manner, by means of connecting rods. Since the invention is directed to the induction system for the engine 16, the details of the engine which do not relate to the induction system will be described only generally and may be considered to be conventional.

A cylinder head 23 is affixed to the cylinder block 19 in a known manner. The cylinder head 23 has individual recesses or cavities 24 that cooperate with the head of the piston 21 and the cylinder bores 22 to provide variable volume chambers. The volume of the chambers varies during the reciprocation of the pistons 22 and, at times, the cavities 24 will be referred to as combustion chambers.

Intake passages 25 extend through one side of the cylinder head 16 and terminate at a pair of intake ports 26 that cooperate with each of the chambers 24. The passages 25 are siamesed. That is, one passage 25 cooperates with a pair of intake ports 26 for each respective cylinder. Intake valves 27 are slidably supported by the cylinder head assembly 23 in a known manner and cooperate with the intake ports 26 for controlling the flow through them.

In a similar manner, exhaust passages 28 extend through the opposite side of the cylinder head and each terminate in a pair of exhaust ports 29. Exhaust valves 31 are slidably supported within the cylinder head 23 and control the flow through the exhaust ports 29. The intake valves 27 and exhaust valves 31 are operated in a suitable manner, as by means of a pair of overhead mounted camshafts 32.

A fuel injection nozzle 33 is supported in the cylinder head 23 in proximity to each of the intake passages 25 for discharging fuel into the intake passage 25 upstream of the intake ports 26 to form a fuel/air charge that is delivered through the intake valves 27 into the chamber 24. This charge is fired by means of a spark plug 34 which is generally centrally positioned and then the burnt charge is discharged to the atmosphere through an exhaust system (not shown) which includes the exhaust passages 28.

As thus far described, the construction of the engine 16 may be considered to be conventional and, for that reason, the basic components of the engine have not been described in great detail. In accordance with the invention, an induction system, indicated generally by the reference numeral 35, is provided for delivering a tuned air charge to the cylinder head intake passages 25 so as to improve the running of the engine throughout its entire speed and load ranges. This induction system includes a valve block, indicated generally by the reference numeral 36, which is affixed to the cylinder head 23 and specifically its intake side. The valve block 36 has a plurality of intake passages 37 which register, respectively, with the cylinder head intake passages 25. Throttle valves 38 are positioned in each of the intake passages 37 for controlling the flow therethrough. The throttle valves 38 are all affixed to a common throttle valve shaft and are operated in unison by means of an accelerator linkage (not shown) that is connected to the accelerator pedal positioned in the passenger compartment of the vehicle 11.

An intake manifold 39 is affixed to the valve block 36. The intake manifold 39 has individual runners that terminate in outlets 41 that communicate with the valve block passages 37. Each outlet 41 is served by a first inlet 42 and a second inlet 43. The inlet 43 is generally aligned with the outlet 41 on a horizontal plane while the inlet 42 extends generally perpendicularly to the outlet 41.

Each inlet 42 cooperates with a respective long intake passageway 43 that is formed by a manifold extension 44 which is affixed to the manifold 39. The passages 43 all emanate from a plenum chamber 45 formed in a first air inlet device 46. The first air inlet device 46 is located remotely from the engine as shown in FIG. 3 so that the passages 43 may have sufficient length to permit tuning for good performance at low engine speeds. Also, the passages 43 open into the inlet device 46 in the same longitudinal relation as the inlet openings 42 are located so that the passages 43 each have the same length. The inlet device 46 has a suitable air inlet opening (not shown) so as to permit atmospheric air to be drawn into the plenum chamber 45 for distribution to the intake passages 43.

The inlet openings 43 are served by relatively short trumpets 47 that are all contained within a plenum chamber 48 of a second air inlet device 49. The inlet device 49 is positioned close to the inlet side of the engine 16 and adjacent the fire wall 14 (FIG. 3). As a result, the intake passageways serving the inlet openings 43 are very short and may be tuned for good high speed performance. The inlet device 49 is provided with a suitable atmospheric air inlet so as to permit the plenum chamber 48 to be recharged.

Throttle valves 51 are positioned in each of the inlet openings 43 for controlling their communication with the engine induction system. The throttle valves 51 are all connected to a common throttle valve shaft that is operated by a vacuum servo motor, indicated generally by the reference numeral 52. The vacuum servo motor 52 has a diaphragm 53 that divides it into an atmospheric chamber 54 and a control chamber 55. The diaphragm 53 is connected by means of a linkage system, indicated schematically at 56 to the throttle valves 51 for operating them.

The control chamber 53 selectively receives either atmospheric pressure from the plenum chamber 48 or a vacuum signal, from a source to be described, under the control of a valve 57 which is, in turn, operated by a computer 58. In the illustrated embodiment, the computer 58 sends a signal to the valve 57 that is responsive to engine speed (Ne) and position of the throttle valves 38 $\theta$th. It is to be understood, however, that other signals may be utilized to control the opening of the throttle valves 51.

When the valve 57 is in a position that atmospheric pressure is present in the control chamber 55, the throttle valves 51 will be closed. However, when the atmospheric source is discontinued and the vacuum source initiated by the valve 57, the diaphragm 53 will be deflected so as to open the throttle valves 51.

The manifold 39 is provided with a section 59 that forms a transversely extending balance passage 61. The passage 61 extends transversely across the manifold 39 and communicates with the valve body passages 37 downstream of the throttle valves 38 through balance passage openings 62. A pressure tap, indicated by the line 63, extends from the balance passage 61 to the valve 57 to provide the vacuum source for this valve as aforedescribed.

The engine 16 operates as follows. When the engine is idling, the throttle valves 38 will be substantially fully closed as will the throttle valves 51. The intake charge is, therefore, primarily delivered to the individual cylinder head intake passages 25 from the balance passage openings 62 and balance passage 61. It should be noted that the cylinders fire alternately and, hence, only one cylinder will be undergoing an intake cycle at a given time. Therefore, the intake charge for each cylinder may be drawn from the portion of the remaining cylinders downstream of the throttle valves 38, upstream of the intake valves 27 and in the balance passageways. This insures a relatively high velocity of air flow so as to insure good turbulence and rapid flame propagation at low speeds.

As the throttle valves 38 progressively open, the intake charge will be drawn more primarily through the inlet opening 42 and passages 43 from the plenum chamber 45. Due to the long length of the intake passages 43, there will be good tuning so as to provide good performance at these low engine speeds. At the same time, the device will offer good intake silencing.

Figure 4:
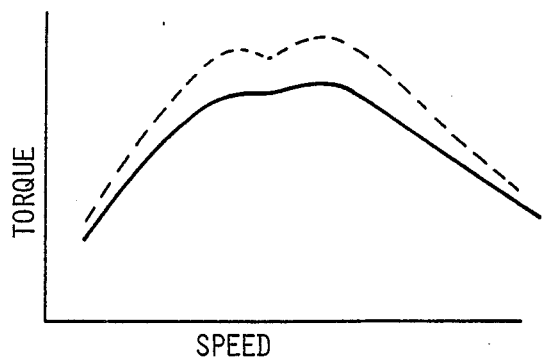
FIG. 4 is a torque curve showing the effects of the invention.
Figure 5:
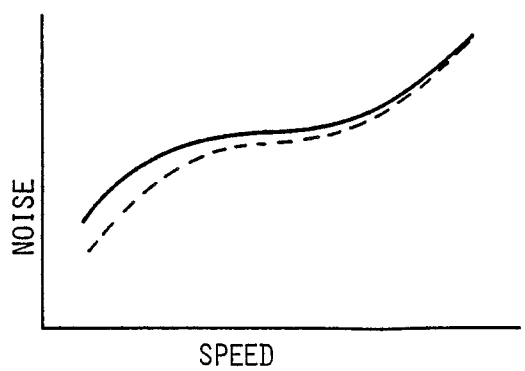
FIG. 5 is a noise curve showing the effects of the invention.

As the speed of the engine increases and the opening of the throttle valves 38 increases, eventually the computer 58 will activate the valve 57 so as to open the throttle valves 51. When this occurs, the intake charge will be drawn primarily from the plenum chamber 48 and intake openings 43. This is because these passages are shorter and offer less flow resistance so that a shorter effective intake length is provided that will be tuned to provide greater performance at the high end of the engine speed. Thus, it should be readily apparent that the device operates to increase power throughout the entire speed and load ranges. This may be seen from FIG. 4 wherein the torque speed curve of a conventional engine is shown by a solid line and that of one having the dual tuned intake passageways as shown by the dotted line. In the same manner, the induction system will operate more quietly as shown in FIG. 5 wherein the induction system sound of the conventional engine is indicated by the solid line and that of the dual induction system in accordance with this invention is shown by the broken line.

It should be readily apparent, therefore, that this invention provides an extremely improved engine performance throughout the entire engine speed and load ranges since the induction system need not be tuned to favor a specific and compromise condition but rather can be tuned so as to suit both high and low speed running. In addition, effective silencing is provided due to this system. Although an embodiment of the invention has been illustrated and described, various changes and modifications may be made without departing from the spirit and scope of the invention, as defined by the appended claims.

We claim:

1. An intake system for an internal combustion engine having a variable volume chamber an inlet port serving said chamber, a first intake passage having an air inlet at one end and an outlet end serving said inlet port, a second intake passage having an inlet end and an outlet end serving said inlet port, said second intake passage outlet end communicating with said first intake passage between its air inlet end and the outlet end of said first intake passage, said second intake passage having a substantially different length than said first intake passage, a first plenum chamber communicating with said inlet end of said first intake passage for serving first intake passage, means for supplying atmospheric air to said first plenum chamber, a second plenum chamber spaced from said first plenum chamber and serving said inlet end of said second intake passage, means for supplying atmospheric air to said second plenum chamber, and a throttle valve for selectively controlling a flow through only one of said intake passages.

2. An intake system as set forth in claim 1 wherein the first intake passage is relatively long and tuned for low speed running and the second intake passage is relatively short and is tuned for high speed running.

3. An intake system as set forth in claim 1 further including manually operated throttle valve means for controlling the flow through both of said intake passages.

4. An intake system as set forth in claim 3 wherein the first intake passage is relatively long and tuned for low speed running and the second intake passage is relatively short and is tuned for high speed running, said first and said second intake passages having a common portion in which said manually operated throttle valve means is position.

5. An intake system as set forth in claim 1 wherein the throttle valve controls the flow through only the second intake passage.

6. An intake system as set forth in claim 1 wherein the engine has multiple cylinders each served by inlet ports and first and second intake passages.

7. An intake system as set forth in claim 6 further including balance passage means interconnecting the inlet ports of the cylinders with each other.

8. An intake system as set forth in claim 7 wherein the first and second intake passages have a common portion in which manually positioned throttle valves are provided.

9. An intake system as set forth in claim 8 wherein the balance passage means communicates with the common portion downstream of the manually positioned throttle valves.

10. An intake system as set forth in claim 6 in combination with a motor vehicle wherein the cylinders are aligned transversely in an engine compartment of the vehicle.

11. An intake system as set forth in claim 10 further including balance passage means interconnecting the inlet ports of the cylinders with each other.

12. An intake system as set forth in claim 11 wherein the first and second intake passages have a common portion in which manually positioned throttle valves are provided.

13. An intake system as set forth in claim 12 wherein the balance passage means communicates with the common portion downstream of the manually positioned throttle valve.

14. An intake system as set forth in claim 10 wherein the first intake passage is relatively long and tuned for low speed running and the second intake passage is relatively short and is tuned for high speed running.

15. An intake system as set forth in claim 14 wherein the first plenum chamber is positioned at one end of the engine and the second plenum chamber is positioned at one side of the engine.

16. An intake system for an internal combustion engine having a cylinder head forming a combustion chamber, an inlet port formed in said cylinder head and serving said chamber, a first intake passage extending from said inlet port to an inlet end disposed at one side of said cylinder head, a second intake passage having an inlet end on the other side of said cylinder head and an outlet end communicating with said first intake passage on said one side of said cylinder head for serving said inlet port, said second intake passage having a substantially different length than said first intake passage, and throttle valve means for selectively controlling the flow through said intake passages.

17. An intake system as set forth in claim 16 wherein the second intake passage is relatively long and tuned for low-speed running and the second intake passage is relatively short and is tuned for high-speed running.

18. An intake system as set forth in claim 16 further including manually operated throttle valve means for controlling the flow through both of said intake passages.

19. An intake system as set forth in claim 18 wherein the second intake passage is relatively long and tuned for low-speed running and the first intake passage is relatively short and is tuned for high-speed running, said first and said second intake passages having a common portion in which said manually operated throttle valve means is positioned.

20. An intake system as set forth in claim 16 wherein the throttle valve means controls the flow through only one of the intake passages.

21. An intake system as set forth in claim 16 further including a first plenum chamber serving the first intake passage and a second plenum chamber serving the second intake passage.

22. An intake system as set forth in claim 16 wherein the cylinder has multiple combination chambers each served by inlet ports and first and second intake passages.

23. An intake system as set forth in claim 22 further including balance passage means interconnecting the inlet ports of the cylinders with each other.

24. An intake system as set forth in claim 23 wherein the first and second intake passages have a common portion in which manually positioned throttle valves are provided.

25. An intake system as set forth in claim 24 wherein the balance passage means communicates with the common portion downstream of the throttle valve means.

26. An intake system as set forth in claim 22 further including a first plenum chamber serving the first intake passages and a second plenum chamber serving the second intake passages.

27. An intake system as set forth in claim 22 in combination with a motor vehicle wherein the cylinders are aligned transversely in an engine compartment of the vehicle.

28. An intake system as set forth in claim 27 further including balance passage means interconnecting the inlet ports of the cylinders with each other.

29. An intake system as set forth in claim 28 wherein the first and second intake passages have a common portion in which manually positioned throttle valves are provided.

30. An intake system as set forth in claim 29 wherein the balance passage means communicates with the common portion downstream of the manually operated throttle valves.

31. An intake system as set forth in claim 27 further including a first plenum chamber serving the first intake passage and a second plenum chamber serving the second intake passage.

32. An intake system as set forth in claim 31 wherein the second intake passage is relatively long and tuned for low-speed running and the first intake passage is relatively short and is tuned for high-speed running.

33. An intake system as set forth in claim 32 wherein the first plenum chamber being positioned at one end of the engine and the second plenum chamber being positioned at the other side of the engine.

34. An intake system as set forth in claim 1 wherein the second intake passage is substantially straight and wherein the first intake passage has a curved portion.

35. An intake system as set forth in claim 34 wherein the second intake passage intersects the curved portion of the first intake passage in a substantially tangential direction.

36. An intake system as set forth in claim 35 wherein the first intake passage is relatively long and tuned for low speed running and the second intake passage is relatively short and is tuned for high speed running.

37. An intake system as set forth in claim 17 wherein the first intake passage extends in a generally straight direction from its inlet end to its outlet end and wherein the second intake passage has a curved section.

38. An intake system as set forth in claim 37 wherein the first intake passage extends substantially tangentially to a curved portion of the second intake passage.

39. An intake system as set forth in claim 37 wherein the first intake passage extends substantially tangentially to a curved portion of the second intake passage.

40. An intake system as set forth in claim 17 wherein the cylinder head further supports a spark plug and neither of the first nor second intake passages extends across the upper periphery of the spark plug for facilitating access to the spark plug.

41. An intake system as set forth in claim 40 wherein the first intake passage extends in a generally straight direction from its inlet end to its outlet end and wherein the second intake passage has a curved section.

42. An intake system as set forth in claim 40 further including a first plenum chamber for supplying air to the inlet end of the first intake passage and a second plenum chamber for delivering air to the inlet end of the second intake passage, neither of said plenum chambers lying above the spark plug for facilitating access to the spark plug.

43. An intake system as set forth in claim 22 wherein each of the combustion chambers has a spark plug associated therewith mounted in the cylinder head, none of the first or second intake passages passing above said spark plugs for facilitating access to said spark plugs.

44. An intake system as set forth in claim 43 further including a first plenum chamber for supplying air to the inlet ends of the first intake passages and a second plenum chamber for delivering air to the inlet ends of the second intake passages, neither of said plenum chambers lying above the spark plug for facilitating access to the spark plug.

45. An intake system as set forth in claim 27 wherein portions of the second intake passages extend above the cylinder head and in the path of air flow through the engine compartment of the vehicle for facilitating cooling thereof.

46. An intake system as set forth in claim 27 wherein each of the combustion chambers has a spark plug associated therewith mounted in the cylinder head, none of the first or second intake passages passing above said spark plugs for facilitating access to said spark plugs.

47. An intake system as set forth in claim 46 further including a first plenum chamber for supplying air to the inlet ends of the first intake passages and a second plenum chamber for delivering air to the inlet ends of the second intake passage, neither of said plenum chambers lying above the spark plug for facilitating access to the spark plug.

* * * * *

UNITED STATES PATENT AND TRADEMARK OFFICE
CERTIFICATE OF CORRECTION

PATENT NO. : 4,898,144

DATED : February 6, 1990

INVENTOR(S) : Kobayashi, et al

It is certified that error appears in the above-identified patent and that said Letters Patent is hereby corrected as shown below:

Abstract lines 2-3, "pasasges" should be --passages--.

Column 5, line 57, Claim 4, "position" should be --positioned--.

Column 6, line 45, Claim 17, "second" should be --first--.

Column 8, line 6, Claim 39, "37" should be --41--.

Signed and Sealed this

Twenty-second Day of September, 1992

Attest:

DOUGLAS B. COMER

*Attesting Officer*    *Acting Commissioner of Patents and Trademarks*